(12) United States Patent
Erol et al.

(10) Patent No.: US 7,643,705 B1
(45) Date of Patent: Jan. 5, 2010

(54) TECHNIQUES FOR USING A CAPTURED IMAGE FOR THE RETRIEVAL OF RECORDED INFORMATION

(75) Inventors: Berna Erol, Burlingame, CA (US); Jonathan J. Hull, San Carlos, CA (US); Dar-Shyang Lee, Union City, CA (US)

(73) Assignee: Ricoh Company Ltd., Tokyo (JP)

( * ) Notice: Subject to any disclaimer, the term of this patent is extended or adjusted under 35 U.S.C. 154(b) by 1374 days.

(21) Appl. No.: 10/696,735

(22) Filed: Oct. 28, 2003

Related U.S. Application Data

(60) Provisional application No. 60/462,412, filed on Apr. 11, 2003.

(51) Int. Cl.
*G06F 17/00* (2006.01)

(52) U.S. Cl. .......................................... 382/305; 707/3

(58) Field of Classification Search ................. 382/100, 382/218, 305, 306; 707/3, 6; 715/200, 254, 715/255
See application file for complete search history.

(56) References Cited

U.S. PATENT DOCUMENTS

| | | | |
|---|---|---|---|
| 5,583,980 A | 12/1996 | Anderson | 395/173 |
| 5,960,448 A | 9/1999 | Reichek et al. | 707/526 |
| 5,974,372 A | 10/1999 | Barnes et al. | 704/8 |
| 6,122,647 A | 9/2000 | Horowitz et al. | 707/513 |
| 6,243,713 B1 | 6/2001 | Nelson et al. | 707/104 |
| 6,370,498 B1 | 4/2002 | Flores et al. | 704/3 |
| 6,404,925 B1 * | 6/2002 | Foote et al. | 382/224 |
| 6,560,637 B1 | 5/2003 | Dunlap et al. | 709/204 |
| RE38,284 E | 9/2003 | Yu et al. | 156/64 |
| 6,636,238 B1 | 10/2003 | Amir et al. | 345/730 |
| 6,646,655 B1 | 11/2003 | Brandt et al. | 345/723 |
| 6,701,014 B1 * | 3/2004 | Syeda-Mahmood | 382/199 |
| 6,732,915 B1 | 5/2004 | Nelson et al. | 235/375 |
| 6,825,849 B1 | 11/2004 | Minakuchi et al. | 345/581 |
| 6,839,059 B1 | 1/2005 | Anderson et al. | 345/501 |
| 7,051,276 B1 | 5/2006 | Mogilevsky et al. | 715/517 |
| 7,121,469 B2 | 10/2006 | Dorai et al. | 235/470 |
| 7,206,773 B2 | 4/2007 | Erol et al. | 707/1 |
| 7,236,632 B2 | 6/2007 | Erol et al. | 382/218 |
| 7,248,782 B2 | 7/2007 | Kasutani | 386/69 |
| 7,263,659 B2 | 8/2007 | Hull et al. | 715/716 |
| 7,266,568 B1 | 9/2007 | Erol et al. | 707/104.1 |
| 7,281,199 B1 | 10/2007 | Nicol et al. | 715/500.1 |
| 7,394,938 B2 | 7/2008 | Erol et al. | 382/218 |

(Continued)

FOREIGN PATENT DOCUMENTS

EP 0 459 793 A1 12/1991

(Continued)

OTHER PUBLICATIONS

Brotherton et al., "Automated Capture, Integration, and Visualization of Multiple Media Streams," *Proceedings of IEEE Multimedia '98*, (1998).

(Continued)

*Primary Examiner*—Andrew W Johns
(74) *Attorney, Agent, or Firm*—Townsend and Townsend and Crew LLP

(57) ABSTRACT

A method for determining a recorded presentation information document is provided. The method comprises: receiving information identifying an input image; comparing the input image with a plurality of image file documents to determine an image file document in the plurality of image file documents that includes information that is considered to match the input image; and determining a recorded presentation information document that is associated with the image file document that was determined.

101 Claims, 11 Drawing Sheets

U.S. PATENT DOCUMENTS

| | | |
|---|---|---|
| 2002/0034373 A1 | 3/2002 | Morita et al. ............... 386/1 |
| 2002/0056082 A1 | 5/2002 | Hull et al. ................... 725/1 |
| 2002/0120939 A1 | 8/2002 | Wall et al. .................. 725/87 |
| 2002/0164151 A1 | 11/2002 | Jasinschi et al. ........... 386/69 |
| 2002/0191013 A1 | 12/2002 | Abrams ................... 345/730 |
| 2003/0009342 A1 | 1/2003 | Haley ...................... 704/276 |
| 2003/0011684 A1 | 1/2003 | Narayanaswami et al. ................. 348/207.99 |
| 2003/0101043 A1 | 5/2003 | Boegelund et al. ............ 704/3 |
| 2003/0169461 A1 | 9/2003 | Gaebel et al. ............. 358/442 |
| 2003/0191633 A1 | 10/2003 | Berger ...................... 704/205 |
| 2004/0133845 A1 | 7/2004 | Forstall et al. ............ 715/500 |
| 2004/0205041 A1 | 10/2004 | Erol et al. .................. 707/1 |
| 2004/0205477 A1 | 10/2004 | Lin ........................ 715/500.1 |
| 2004/0205478 A1 | 10/2004 | Lin et al. ................ 715/500.1 |
| 2004/0205601 A1 | 10/2004 | Smith ....................... 715/516 |
| 2005/0041872 A1 | 2/2005 | Yim et al. ................. 382/232 |
| 2005/0084154 A1 | 4/2005 | Li et al. .................... 382/190 |
| 2006/0002607 A1* | 1/2006 | Boncyk et al. ............ 382/165 |
| 2006/0285772 A1 | 12/2006 | Hull et al. ................. 382/305 |
| 2007/0127823 A1 | 6/2007 | Seeber ...................... 382/218 |
| 2007/0204229 A1 | 8/2007 | Erol et al. .................. 715/730 |
| 2007/0288523 A1 | 12/2007 | Erol et al. ............... 707/104.1 |

FOREIGN PATENT DOCUMENTS

| | | |
|---|---|---|
| JP | 2001-318919 A | 11/2001 |
| JP | 2002-207773 A | 7/2002 |
| JP | 2002-538536 A | 11/2002 |
| JP | 2002-544596 A | 12/2002 |
| WO | WO 99/50736 A1 | 10/1999 |
| WO | WO 00/52596 A2 | 9/2000 |

OTHER PUBLICATIONS

Chiu et al., "Room with a Rear View: Meeting Capture in a Multimedia Conference Room," *IEEE Multimedia Magazine*, 7(4):48-54 (2000).

Chiu et al., "Automatically Linking Multimedia Meeting Documents by Image Matching," *Proceedings of Hypertext '00*, ACM Press, pp. 244-245 (2000).

Franklin et al., "Jabberwocky: you don't have to be a rocket scientist to change slides for a hydrogen combustion lecture," *Intelligent User Interfaces*, pp. 98-105 (2000).

Lee et al., "Portable Meeting Recorder," *ACM Multimedia Conference*, 2002.

Lienhart et al., "Localizing and Segmenting Text in Images, Video and Web Pages," *IEEE Transactions On CSVT*, pp. 256-268 (2002).

Mukhopadhyay et al., "Passive capture and structuring of lectures," *ACM Multimedia*, pp. 477-487 (1999).

Muller et al., "The 'Authoring of the Fly' system for Automated Recording and Replay of (Tele)presentations," *ACM/Springer Multimedia Systems Journal*, vol. 8, No. 3 (2000).

Multi-university Research Laboratory, murl.microsoft.com; webpage printed Feb. 18, 2004.

Otsu, N., "A threshold selection method from gray-level histograms," *IEEE Transactions on Systems, Man and Cybernetics*, pp. 62-66 (1979).

Pimentel et al., "Linking by Interacting: a Paradigm for Authoring Hypertext," *Proceedings of ACM Hypertext '2000*, May 2000.

Scansoft Capture Development System, www.scansoft.com; webpage printed Feb. 18, 2004.

Transym OCR engine, http://www.transym.com/, (date unknown).

Trier et al., "Goal-Directed Evaluation of Binarization Methods," *IEEE Transactions on Pattern Analysis and Machine Intelligence*, pp. 1191-1201 (1995).

Waibel et al., "Advances in automatic meeting record creation and access," *Proceedings of ICASSP*, Seattle (2001).

WebEx Presentation Studio, presenter.com, (date unknown).

Stifelman, "The Audio Notebook: Paper and Pen Interaction with Structured Speech;" Sep. 1997; Ph.D Thesis; Massachusetts Institute of Technology.

Stifelman, et al.; "The Audio Notebook: paper and pen interaction with structured speech;" *Proc. of International Conf. on Human Factors in Computing Systems* Mar. 31-Apr. 5, 2001; pp. 182-189; CHI.

Web page; "TELEform V7—Digitale Beleglesung, Automatische Datenerfassung aus Formularen;" Form-Solutions; at URL=http://www.form-solutions.net/dl/Teleform.pdf>; printed Feb. 10, 2005; 5 pages.

Web page; "Xerox Office Software Suite FlowPort Version 2.1.1;" *Capture and Distribution*; at URL=http://www.xrce.xerox.com/showroom/pdf/flowport.pdf>; printed Feb. 10, 2005; 4 pages.

Won et al.; "Efficient Use of MPEG-7 Edge Histogram Descriptor;" *ETRI Journal*; Feb. 2002; pp. 23-30; vol. 24; No. 1.

U.S. Appl. No. 12/350,900, filed Jan. 8, 2009, Erol et al.

Stricker et al., "Similarity of Color Images," SPIE 95, 1995, pp. 1-12, San Jose.

Peng et al., "Document image template matching based on component block list," Pattern Recognition Letter 22, 2001, pp. 1033-1042, Elsevier Science B.V.

Non-Final Office Action for U.S. Appl. No. 10/660,985, mailed May 22, 2006, 10 pages.

Non-Final Office Action for U.S. Appl. No. 10/660,985, mailed Nov. 14, 2006, 8 pages.

Notice of Allowance for U.S. Appl. No. 10/660,985, mailed May 3, 2007, 15 pages.

Non-Final Office Action for U.S. Appl. No. 10/661,052, mailed Mar. 27, 2006, 13 pages.

Final Office Action for U.S. Appl. No. 10/661,052, mailed Dec. 19, 2006, 19 pages.

Non-Final Office Action for U.S. Appl. No. 10/661,052, mailed Apr. 19, 2007, 23 pages.

Non-Final Office Action for U.S. Appl. No. 10/661,052, mailed Mar. 27, 2008, 23 pages.

Final Office Action for U.S. Appl. No. 10/661,052, mailed Oct. 28, 2008, 26 pages.

Non-Final Office Action for U.S. Appl. No. 10/661,052, mailed Mar. 3, 2009, 32 pages.

Non-Final Office Action for U.S. Appl. No. 10/660,867, mailed May 15, 2006, 11 pages.

Notice of Allowance for U.S. Appl. No. 10/660,867, mailed Nov. 1, 2006, 9 pages.

Notice of Allowance for U.S. Appl. No. 12/350,900, mailed Jul. 13, 2009, 9 pages.

Requirement for Restriction/Election for U.S. Appl. No. 10/412,757, mailed Oct. 31, 2006, 4 pages.

Notice of Allowance for U.S. Appl. No. 10/412,757, mailed Feb. 27, 2007, 12 pages.

Non-Final Office Action for U.S. Appl. No. 11/749,606, mailed Dec. 12, 2007, 6 pages.

Notice of Allowance for U.S. Appl. No. 11/749,606, mailed Feb. 15, 2008, 6 pages.

Notice of Allowance for U.S. Appl. No. 11/749,606, mailed Mar. 10, 2008, 1 page.

Final Office Action for U.S. Appl. No. 10/661,052, mailed Oct. 28, 2008, 26 pages.

Non-Final Office Action for U.S. Appl. No. 10/661,052, mailed Mar. 3, 2009, 32 pages.

Non-Final Office Action for U.S. Appl. No. 10/660,867, mailed May 15, 2006, 11 pages.

Notice of Allowance for U.S. Appl. No. 10/660,867, mailed Nov. 1, 2006, 9 pages.

Notice of Allowance for U.S. Appl. No. 12/350,900, mailed Jul. 13, 2009, 9 pages.

Non-Final Office Action for U.S. Appl. No. 11/671,177 mailed Jun. 22, 2009, 19 pages.

Requirement for Restriction/Election for U.S. Appl. No. 10/412,757, mailed Oct. 31, 2006, 4 pages.

Notice of Allowance for U.S. Appl. No. 10/412,757, mailed Feb. 27, 2007, 12 pages.

Non-Final Office Action for U.S. Appl. No. 11/749,606, mailed Dec. 12, 2007, 6 pages.

Notice of Allowance for U.S. Appl. No. 11/749,606, mailed Feb. 15, 2008, 6 pages.

Chiu et al., "LiteMinutes: an Internet-based system for multimedia meeting minutes," Proceedings of the 10th international conference on World Wide Web, May 2001, pp. 140-149, at URL: http://portal.acm.org/ft_gateway.cfm?id=371971&type=pdf&collACM&di=ACM&CFID=52114454&CFTOKEN=66592544>.

Weber et al., "Live documents with contextual, data-driven information components," Proceedings of the 20th annual international conference on Computer documentation table of contents, Oct. 2000, pp. 236-247, at URL: http://portal.acm.org/ft_gateway.cfm?id=584990&type=pdf&col1=ACM&di=ACM&CFID=52114454&CFTOKEN=66592544>.

Notice of Allowance for U.S. Appl. No. 10/661,052, mailed Oct. 2, 2009, 24 pages.

Notice of Allowance for U.S. Appl. No. 12/350,900, mailed Sep. 18, 2009, 9 pages.

\* cited by examiner

TECHNIQUES FOR USING A CAPTURED IMAGE FOR THE RETRIEVAL OF RECORDED INFORMATION

CROSS-REFERENCES TO RELATED APPLICATIONS

The present application is a non-provisional of and claims priority from U.S. Provisional Application No. 60/462,412, filed Apr. 11, 2003, the entire contents of which are herein incorporated by reference for all purposes.

The present application incorporates by reference for all purposes the entire contents of the following:

U.S. application Ser. No. 10/412,757, filed Apr. 11, 2003 now U.S. Pat. No. 7,236,632;

U.S. application Ser. No. 10/660,985, filed Sep. 12, 2003 now U.S. Pat. No. 7,266,568;

U.S. application Ser. No. 10/661,052, filed Sep. 12, 2003;

U.S. application Ser. No. 10/660,867, filed Sep. 12, 2003 now U.S. Pat. No. 7,206,773; and U.S. application Ser. No. 10/001,895, filed Nov. 19, 2001 now U.S. Pat. No. 7,263,659.

BACKGROUND OF THE INVENTION

The present application generally relates to techniques for accessing recorded information and more particularly to techniques for accessing recorded information using an input image.

Recording information during presentations has gained a lot of popularity in recent years. For example, colleges and universities have started to program classes and lectures, corporations have started to record meetings and conferences, etc. The information during a presentation may be recorded using one or more capture devices. The recorded information may comprise different types or streams of information including audio information, video information, and the like.

The recorded information is then available for use by a user after the presentation. The conventional way for accessing these recordings has been by viewing the recordings sequentially. More efficient techniques are desired for accessing or retrieving the recorded information or indexing into the recorded information.

BRIEF SUMMARY OF THE INVENTION

Embodiments of the present invention relate to determining portions of recorded information using an input image.

In one embodiment, a method for determining a recorded presentation information document is provided. The method comprises: receiving information identifying an input image; comparing the input image with a plurality of image file documents to determine an image file document in the plurality of image file documents that includes information that is considered to match the input image; and determining a recorded presentation information document that is associated with the image file document that was determined.

In another embodiment, a method for determining a recorded presentation information document is provided. The method comprises: determining a captured image, the captured image including a display; determining contents of the display; and using the contents of the display to search a plurality of recorded images documents to identify one or more recorded images documents that include the contents.

A further understanding of the nature and advantages of the invention herein may be realized by reference of the remaining portions in the specifications and the attached drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
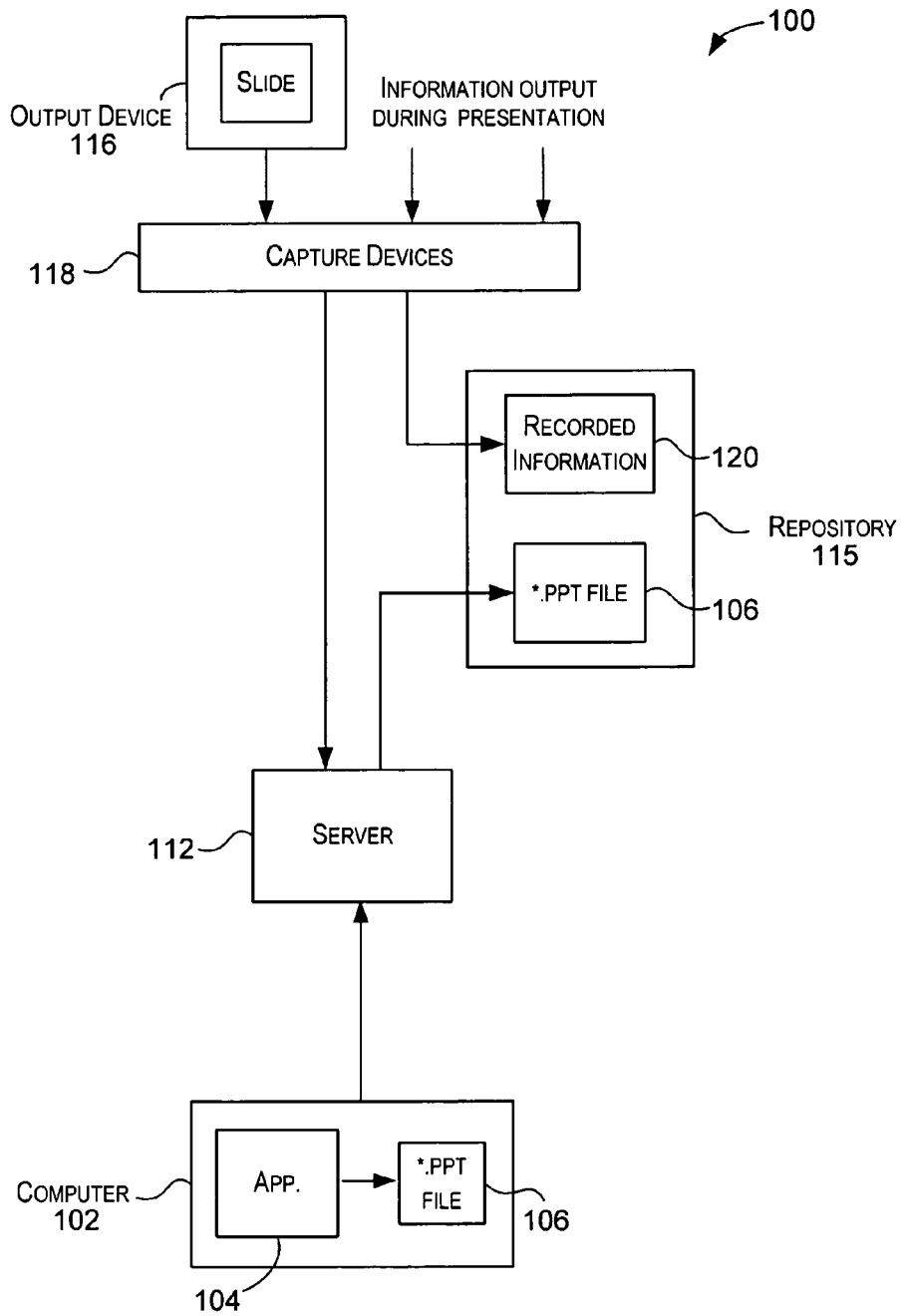
FIG. 1 is a simplified block diagram of a system that may incorporate an embodiment of the present invention.

FIG. 1 is a simplified block diagram of a system 100 that may incorporate an embodiment of the present invention. System 100 depicted in FIG. 1 is merely illustrative of an embodiment incorporating the present invention and does not limit the scope of the invention as recited in the claims. One of ordinary skill in the art will recognize other variations, modifications, and alternatives.

System 100 includes a computer system 102 that may be used by a user to display information at a presentation. Examples of presentations include lectures, meetings, conferences, classes, speeches, demonstrations, etc. The presentation material may include slides, photos, audio messages, video clips, text information, web pages, etc. The user may use one or more applications 104 executed by computer 102 to generate the presentation material. An example of a commonly used application for preparing slides to be presented at a presentation is PowerPoint™ provided by Microsoft™ Corporation. For example, as depicted in FIG. 1, the user may use PowerPoint™ application 104 to create a "presentation.ppt" file 106 (*.ppt file). A *.ppt file created using a PowerPoint™ application may comprise one or more pages, each page comprising one or more slides. A *.ppt file may also store information as to the order in which the slides are to be presented at the presentation and the manner in which the slides will be presented.

In addition to PowerPoint™ presentation files comprising slides, other types of files comprising other presentation material may also be created using different applications executed by computer 102. These files may be referred to in general as "symbolic presentation files". A symbolic presentation file is any file created using an application or program and that comprises at least some content that is to be presented or output during a presentation. A symbolic presentation file may comprise various types of contents such as slides, photos, audio messages, video clips, text, web pages, images, etc. A *.ppt file created using a PowerPoint™ application is an example of a symbolic presentation file that comprises slides.

Capture devices 118 are configured to capture information presented at a presentation. Various different types of information output during a presentation may be captured or recorded by capture devices 118 including audio information, video information, images of slides or photos, whiteboard information, text information, and the like. For purposes of this application, the term "presented" is intended to include displayed, output, spoken, etc. For purposes of this application, the term "capture device" is intended to refer to any device, system, apparatus, or application that is configured to capture or record information of one or more types. Examples of capture devices 118 include microphones, video cameras, cameras (both digital and analog), scanners, presentation recorders, screen capture devices (e.g., a whiteboard information capture device), symbolic information capture devices, etc. In addition to capturing the information, capture devices 118 may also be able to capture temporal information associated with the captured information.

A presentation recorder is a device that is able to capture information presented during a presentation, for example, by tapping into and capturing streams of information from an information source. For example, if a computer executing a PowerPoint™ application is used to display slides from a *.ppt file, a presentation recorder may be configured to tap into the video output of the computer and capture keyframes every time a significant difference is detected between displayed video keyframes of the slides. The presentation recorder is also able to capture other types of information such as audio information, video information, slides information stream, etc. Temporal information may also be captured. The temporal information associated with the captured information indicating when the information was output or captured is then used to synchronize the different types of captured information. Examples of presentation recorders include a screen capture software application, a PowerPoint™ application that allows recording of slides and time elapsed for each slide during a presentation, presentation records described in U.S. application Ser. No. 09/728,560, filed Nov. 30, 2000, U.S. application Ser. No. 09/728,453, filed Nov. 30, 2000, and U.S. application Ser. No. 09/521,252, filed Mar. 8, 2000.

A symbolic information capture device is able to capture information stored in symbolic presentation documents that may be output during a presentation. For example, a symbolic information capture device is able to record slides presented at a presentation as a sequence of images (e.g., as JPEGs, BMPs, etc.). A symbolic information capture device may also be configured to extract the text content of the slides. For example, during a PowerPoint™ slide presentation, a symbolic information capture device may record the slides by capturing slide transitions (e.g., by capturing keyboard commands) and then extracting the presentation images based on these transitions. Whiteboard capture devices may include devices such as a camera appropriately positioned to capture contents of the whiteboard, a screen, a chart, etc.

The information captured by capture devices 118 during a presentation may be stored in a repository or database 115 as recorded information 120. Recorded information 120 may be stored in various formats. For example, a directory may be created in repository 115 for storing recorded information 120, and the various types of information (e.g., audio information, video information, images, etc.) included in recorded information 120 may be stored in the directory. In another embodiment, recorded information 120 may be stored as a file. Various other techniques known to those skilled in the art may also be used for storing the recorded information. The image file may be referred to as being stored in a "document". A document is a file, directory, etc. that includes the image file.

One type of recorded information 120 may include captured image information. Captured image information includes one or more images captured by capture devices 118. For example, captured image information may be an image of a slide outputted from a symbolic presentation document. In one embodiment, a digital camera may have captured the image information. Temporal information, such as a timestamp, may also be recorded with the captured image information. Captured image information may be stored in a "recorded images document".

Another type of recorded information 120 may be referred to as "recorded presentation information". The recorded presentation information includes information, such as audio and/or video information, that includes images of slides outputted from a symbolic presentation document. For example, recorded presentation information may be audio and/or video information of a presentation being given with slides outputted from a symbolic source document. Recorded presentation information may be stored in a "recorded presentation information document".

In addition to storing information recorded during a presentation, a symbolic presentation document may be stored in repository 115. It will be understood that the symbolic presentation document may also be stored in other repositories, such as in computer 102. The image file in repository 115 then may include recorded information 120 and symbolic presentation documents.

Server 112 is configured to store association information for stored information. The stored information may be referred to as an image file. The image file, for example, may include information from a recorded images document or symbolic presentation document. The association information that is stored associates an image file with a recorded presentation information document. When a presentation is recorded, association information to a recorded presentation information document is stored for a document that includes images of slides outputted during the presentation. Also, temporal information that indicates when slides were outputted or captured may also be stored for the image file.

The recorded presentation information document includes images of slides displayed on output device 116 during the presentation. As will be described in more detail below, an input image may be used to access portions of the recorded presentation information document. For example, an image of a slide being displayed on output device 116 may be used to determine an image file that includes information that is consider to match the image. In one embodiment, the image file may be a recorded images document or a symbolic presentation document. Association information for the image file is then used to determine a recorded presentation information document in a plurality of recorded presentation information documents that includes information that is considered to match the image. A portion of the recorded presentation information document that includes information that that is considered to match information in the image file is then determined.

Figure 2:
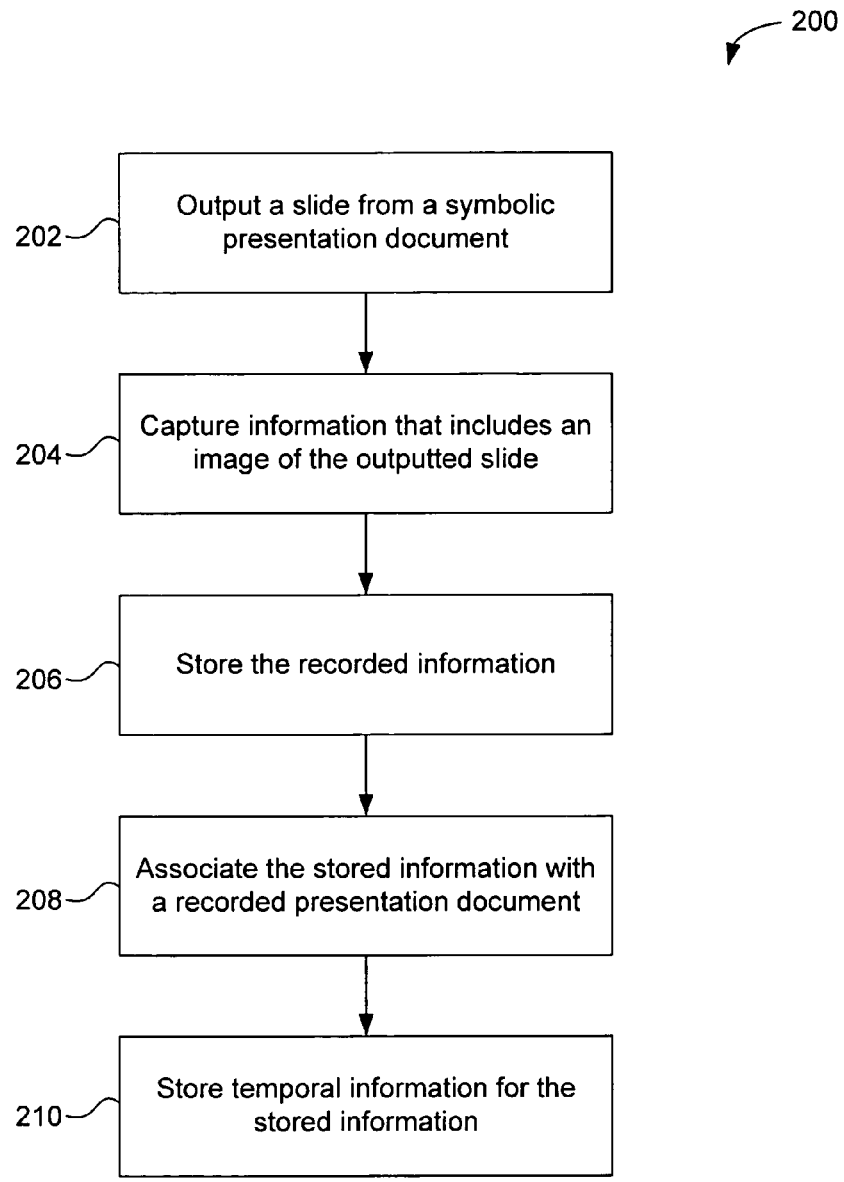
FIG. 2 depicts a simplified flow chart for determining and storing association information for image file according to one embodiment of the present invention.

FIG. 2 depicts a simplified flow chart 200 for determining and storing association information for an image file according to one embodiment of the present invention. The method may be performed by software modules executed by a data processing system, hardware modules or combinations thereof. Flow chart 200 depicted in FIG. 2 is merely illustrative of an embodiment incorporated in the present invention and does not limit the scope of the invention as recited in the claims. One of ordinary skill in the art will recognize variations, modifications, and alternatives.

In step 202, a slide from a symbolic presentation document is outputted. As shown in FIG. 1, a slide may be displayed on an output device 116.

In step 204, information that includes an image of the outputted slide is captured. As described above, the image may be captured by capture devices 118. For example, the image may be captured by a digital camera. Also, the image of the slide may be captured by a presentation recorder or symbolic presentation device. It will also be understood that other methods may be used to capture an image of the outputted slide.

The contents of the image may include information from the outputted slide. For example, the contents may include text and other semantic information. Also, color, layout, edges, and other features of an image may be derived from the input image to facilitate comparison. For example, an edge histogram may be derived from an image of the outputted slide.

In step 206, the captured information of the outputted slide is then stored in one or more recorded images documents. In one embodiment, a series of slide images from a presentation may be stored in a recorded images document. For example, a series of slides that were outputted from a symbolic presentation document for a presentation may be stored in a file or directory in repository 115. In one embodiment, images of slides captured may be stored in a captured image information document, a recorded images document, and a recorded presentation information document.

In step 208, association information that associates an image file with the recorded presentation information document is stored. For example, information is stored so that the recorded images document or symbolic presentation document may be associated with the recorded presentation information document. The association information may associate an image file document to a recorded presentation document. Also, the association information may associate a portion of the image file document to a portion of the recorded presentation document. The association information may be stored in an XML document, which may be embedded in the recorded images document or stored separately.

In another embodiment, association information is stored that associates the symbolic presentation document that outputted the slide in step 202 with the recorded presentation information document. For example, information is stored so that the symbolic presentation document may be associated with the recorded presentation information document. The association information may be stored in an XML document, which may be embedded in the symbolic presentation document or stored separately.

In step 210, temporal information is stored for the image file. For example, temporal information may be stored for the recorded images document or symbolic presentation document. The temporal information may indicate a time that the image was captured. Also, the temporal information may indicate a time that the slide was output from a symbolic presentation document. For example, the temporal information may be a time-stamp. The temporal information may also be a range of times. For example, the range of times may be a time period that a slide is displayed during a presentation.

If times are synchronized where the desired point in the recorded presentation information document corresponds to a time that the outputted slide was captured, the temporal information may be used to determine a portion in the recorded presentation information document that includes the image. The time of the capture device is synchronized with the time of a presentation capture device. For example, if an outputted slide is captured at 1:00 p.m., a point in the recorded presentation information document where the outputted slide may have been displayed is at 1:00 p.m. If the time was synchronized between the recorded presentation information document and capturing of the outputted slide, the point at 1:00 pm in the recorded presentation information document corresponds to when the slide was outputted and may include information that that is considered to match the image of the outputted slide.

The temporal information may also be stored as index points or access points. For example, a table may be created that associates a captured image with an index point or access point in the recorded presentation information document. For example, a pointer to a portion of the recorded presentation information document is stored for each captured slide. An XML table may be used to store the index or access points for the captured image.

Accordingly, using the association information, the image file, such as a symbolic presentation document or a recorded images document, may be associated with a recorded presentation information document. The temporal information may then be used to determine a portion of the recorded presentation information document. As will be described in more detail below, the association and temporal information is used to associate captured image information with a portion of the recorded presentation information.

Figure 3:
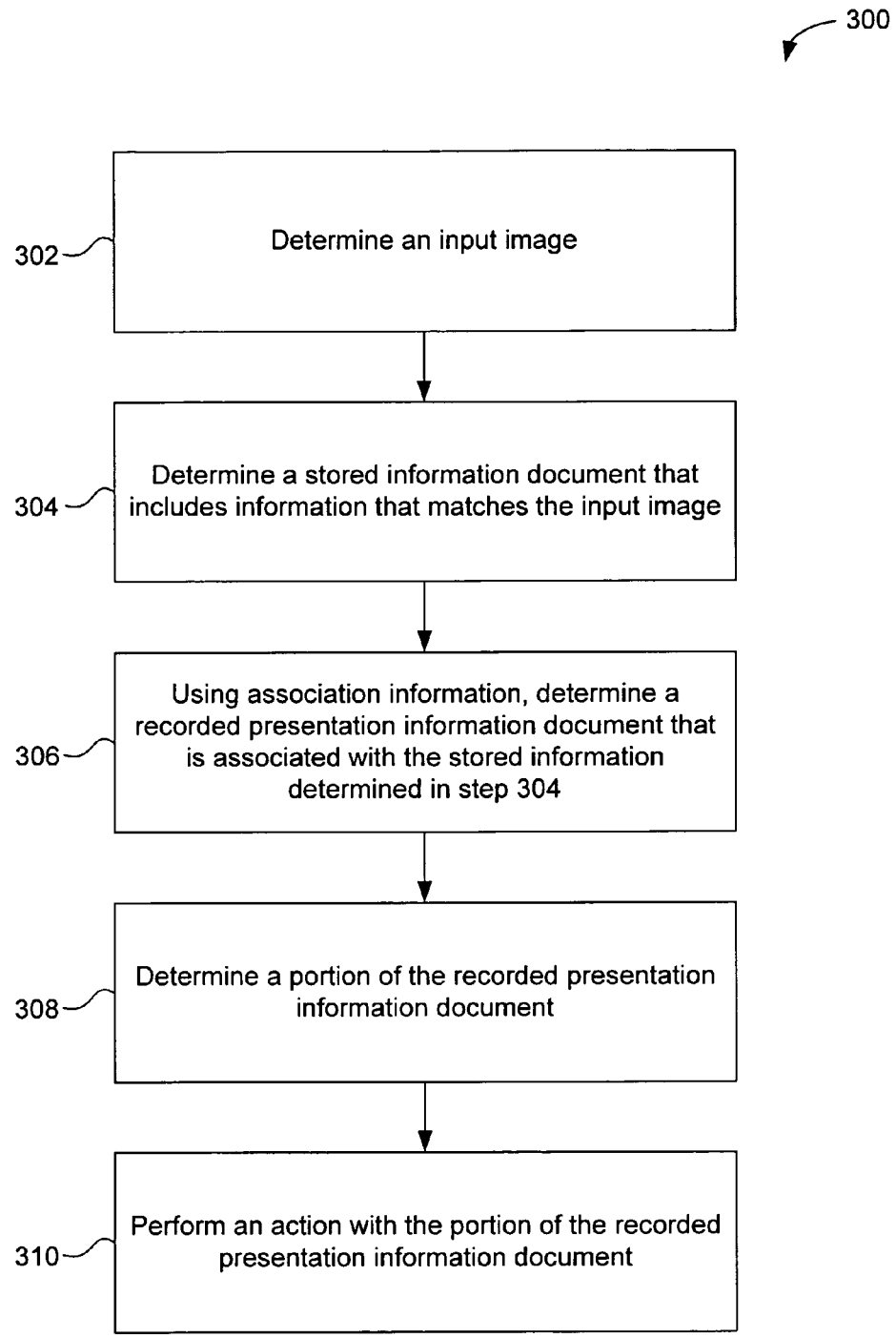
FIG. 3 depicts a simplified flow chart for a method of determining a portion of a recorded presentation information document according to one embodiment of the present invention.

FIG. 3 depicts a simplified flow chart 300 for a method of determining a portion of a recorded presentation information document according to one embodiment of the present invention. The method may be performed by software modules executed by data processing modules, by hardware modules or combinations thereof. Flowchart 300 depicted in FIG. 3 is merely illustrative of an embodiment incorporating the present invention and does not limit the scope of the invention as recited in the claims, one of ordinary skill in the art would recognize variations, modifications and alternatives.

In step 302, an input image is determined. In one embodiment, the input image is an image from a recorded images document in recorded information 120. For example, the input image is an image taken by a digital camera.

In one embodiment, a user may input an identifier for an input image. For example, the identifier may include a storage location that stores the input image. Also, the input image may be received from a device that is storing the image. For example, a capture device 118 that is storing the image may download the input image. Additionally, a hard copy of an image may be scanned by a scanner to generate the input image. A person of skill in the art will appreciate other methods for determining an input image.

In step 304, an image file that includes information that that is considered to match the input image is determined. The input image may be compared to images extracted from the image file to determine an image file that includes information that that is considered to match the input image. For example, a symbolic presentation document or a recorded images document that includes information that that is considered to match the input image is determined.

The information that that is considered to match the input image may include an image of a slide that was outputted on output device 116. A capture device 118 may have captured the image of the slide that was outputted on output device 116. The image may then include information that that is considered to match the input image.

The information that matches the input image may also be an image of a slide in a symbolic presentation document. The input image once again may include an image of a slide outputted on output device 116. The slide was outputted using a slide in the symbolic presentation document. Thus, an image of the slide in symbolic presentation document includes information that matches the input image of a slide outputted on output device 116.

Different techniques may be used to compare an input image to information in an image file. In one embodiment the information that matches the input image is determined using content matching techniques. Examples of content matching techniques that may be used are described in U.S. application Ser. No. 10/412,757, filed Apr. 11, 2003, which is hereby incorporated by reference for all purposes. In one embodiment, an input image is compared to keyframes extracted from the image file document to determine matching information.

In one embodiment, text may be extracted from the input image and compared with text in images extracted from the image file document. For example, text from images of the slide in the symbolic presentation document or the recorded images document may be extracted and compared to text extracted from the input image. An image in the image file and the input image may be considered to be matching when the extracted text substantially matches.

In step 306, using association information, a recorded presentation information document that is associated with the image file determined in step 304 is determined. In one embodiment, association information is determined for an image file. For example, an XML document or a table that lists recorded presentation information documents and which image file is associated with them may be used to determine associated recorded presentation information documents for the image file. In one embodiment, an image file includes images of slides that are outputted and recorded in a recorded presentation, that image file is associated with the recorded presentation information document.

The association information may be determined manually or automatically. For example, a user may manually associate the recorded presentation information document with the image file. Also, when a slide is outputted using a symbolic presentation document, information may be stored that associates a recorded presentation information document that includes information that is considered to be matching an image of the outputted slide in an image file. Further, content matching techniques may be used to determine contents of an image file that includes information that matches information in the recorded presentation information document. If information matches, then the recorded images document or symbolic presentation document that includes the matching information may be associated with the recorded presentation information document.

In step 308, a portion of the recorded presentation information document is determined. In one embodiment, the portion includes information that matches the input image. For example, the portion may include an image of the input image. Thus, information in a slide that is depicted in the input image may match information in an image of a slide in the recorded presentation information document.

In one embodiment, temporal information for the input image or image file may be used to determine the portion of the recorded presentation. For example, a time-stamp associated with the input image is used to determine the portion of the recorded presentation. If the recorded presentation and input image were synchronized, a time-stamp for the input image may be used to determine the portion in the recorded presentation information document. For example, if an input image was captured at 1:00 p.m., information in the recorded presentation information document at a time corresponding to 1:00 p.m. may match information in the input image.

A time range based on the time stamp may be used to determine the portion of the recorded presentation information document. For example, a certain amount of time before and after the time stamp may be used to determine the portion of the recorded presentation information document. The time range may have been stored with the input image and is used to determine the portion of the recorded presentation information document. Alternatively, the time range may be determined based on the time-stamp. For example, a certain amount of time may be added or subtracted from the time-stamp to determine the time range. Also, the time range may correspond to a length of time that a slide was displayed. Accordingly, the time range may include time that is before or after the time that a slide was displayed or the time stamp used to determine the portion of the recorded presentation information document.

In another embodiment, information from the image file, such as an image of a slide in the symbolic presentation document or recorded images document, may be used to determine a portion of the recorded presentation. For example, the image of the slide in the recorded images document may include time information that indicates when the image of the slide was captured. Also, the image of the slide in the symbolic presentation document may include time information that indicates when the image of the slide was outputted. If the stored time information is synchronized with the recorded presentation information, then the time information may be used to determine the portion in the recorded presentation information document. As mentioned above, the time information may be a range of time.

In another embodiment, index or access points for the image file may be used to determine the portion in the recorded presentation information document. The index or access points may have been stored in an XML document and point to portions in the recorded presentation information document.

In another embodiment, content matching techniques may be used to determine the portion of the recorded presentation information document. For example, a time period may be determined where the input image was displayed in the recorded presentation information document. Text may be extracted from the input image and the recorded presentation information document and compared to determine a time period in the recorded presentation where the extracted text matches. For example, a slide that includes text information that matches the extracted text from the input image may be displayed for a time period. It will be understood that the portion of the recorded presentation information document determined may also include time before or after the time period determined.

In another embodiment, the physical location of a device, such as capture device 118, may be used to determine the portion of the recorded presentation information document. For example, the device's outdoor location may be used to interrogate a mapping service to determine a location. In one example, an image of a menu captured by a user may be associated with restaurants in the vicinity of the user's current location. The device's indoor location may also be similarly used to determine the recorded presentation information document. For example, given that a device captured an image in The Explorer Room of the Fairmont Hotel, the image of a presentation slide may be matched only to presentations that occurred or were scheduled to occur in that room. An expected location for capture device 118 or for a user, such as provided from the appointment scheduler on the device, may be used in a similar way to constrain the matching process. The user's seat assignment may be used to determine a seating chart for the room. This may provide an expected distance and angle to the screen. These values may then be provided to the matching process, which may use them to determine the portion of the recorded presentation information document. For example, these values may be used to calculate the expected angular distortion of the text in the image and a correction process could be applied to the image before it is OCR'd. The angle of the device in 3-space, height of the ground and measured distance to the object may be used in a similar way to correct the image before it is recognized further.

In step 310, an action is performed with the portion of the recorded presentation information document. For example, the portion of the recorded presentation may be displayed in an interface. When the portion is displayed, a user may be given the option to play the portion of the recorded presentation information document. Also, the portion of the recorded presentation information document may be displayed and played without input from a user. Further, the portion of the recorded presentation information document may be sent to a device where the device may display the portion of the recorded presentation information document or play the portion recorded presentation information document.

Figure 4:
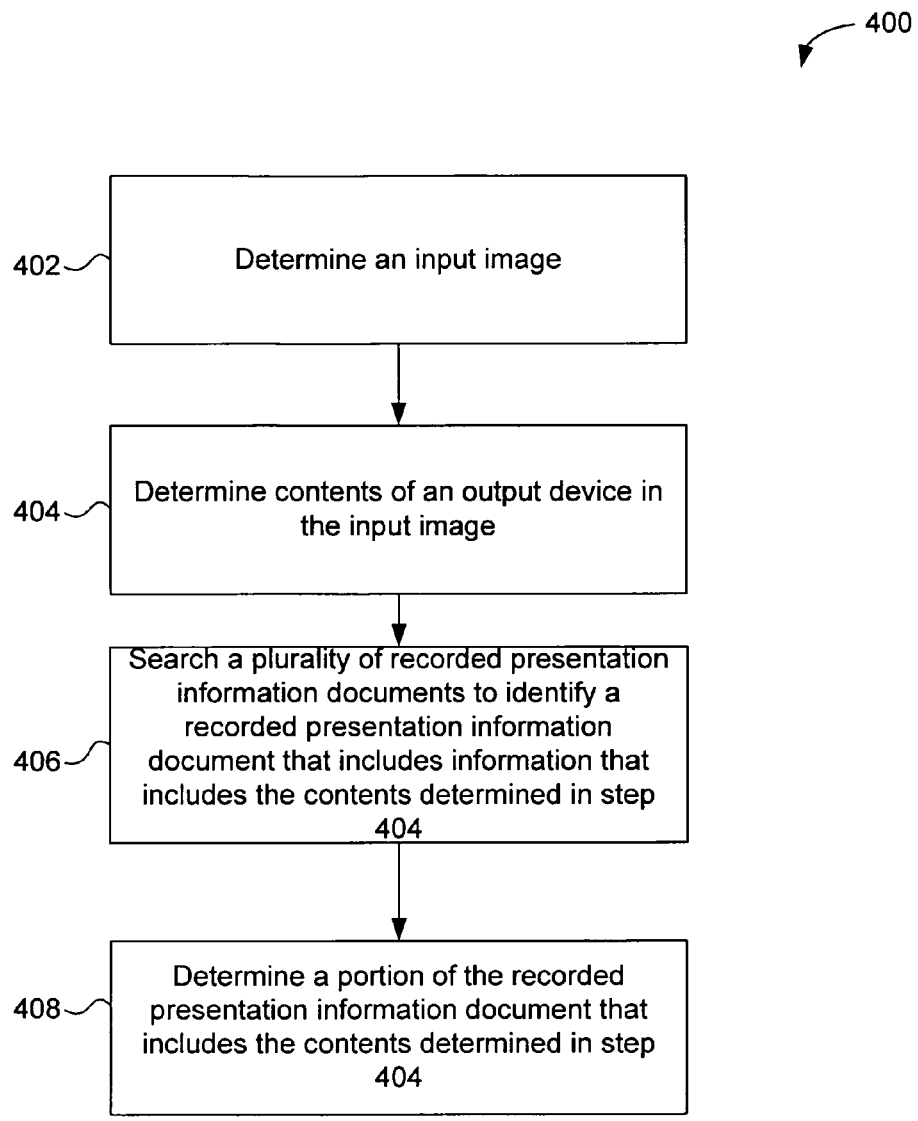
FIG. 4 depicts a simplified flow chart of an alternate embodiment for determining a portion in a recorded presentation information document using an input image according to embodiments of the present invention.

FIG. 4 depicts a simplified flow chart 400 of an alternate embodiment for determining a portion in a recorded presentation information document using an input image according to embodiments of the present invention. The method may be performed by software modules executed by a data processing system, by hardware modules or combinations thereof. Flow chart 400 depicted in FIG. 4 is merely illustrative of an embodiment incorporated in the present invention and does not limit the scope of the invention as recited in the claims. One of ordinary skill in the art will recognize variations, modifications, and alternatives.

In step 402, an input image is determined. In one embodiment, the input image includes an image of output device 116 and the outputted slide. For example, the input image may be captured by a digital camera that took a picture of output device 116 during a presentation.

In step 404, the contents of what the output device is outputting are determined. In one embodiment, the input image may include objects other than the outputted slide. For example, the image may include any surrounding objects located around output device 116, such as a picture of the presenter and any other objects around output device 116.

In determining the contents of what the output device is outputting, an image of the outputted slide may be determined. In one embodiment, the image of the outputted slide is determined by analyzing the image to determine an image of a slide in output device 116. Also, text of the slide may be extracted from the image of the slide. In one embodiment, the text of the slide that is found in the input image is determined. In another embodiment, other features of the display may be used to determine the image. For example, the color, layout, edges, and other features of the image or derived from the image may be used to determine the image. For example, an edge histogram may be derived from the image to determine an image of the outputted slide in the output device.

In step 406, a plurality of recorded presentation information documents are searched to identify a recorded presentation information document that includes the contents determined in step 404. In one embodiment, content matching techniques are used to compare the contents determined in step 404 to the contents of the plurality of recorded presentation information documents. Recorded presentation information documents may be associated with the input image when contents of a recorded presentation include information that matches the contents determined in step 404. For example, if a slide is output during a presentation, the slide may be included in the contents of a recorded presentation information document. Thus, if an input image of a slide is captured and matches contents of a recorded presentation information document, then that recorded presentation information document may be a presentation in which the input image was displayed. Although it is described that one recorded presentation information document is determined, it will be recognized that multiple recorded presentation information documents may be determined. For example, the same slide may be captured in multiple presentations that are given.

In one embodiment, the text extracted from the contents of what an output device is displaying may be compared with text extracted from information in a recorded presentation information document. If the text substantially matches the text in an image of the recorded presentation information document, that recorded presentation information document is determined to include information that includes the contents determined in step 404.

In step 408, a portion in the recorded presentation information document is determined that includes the contents determined in step 404. In one embodiment, time information may be used to determine the portion in recorded presentation information document. For example, a time-stamp associated with the input image may be used to determine a portion in the recorded presentation information document. If the presentation and input image were captured at the same time, then the time stamp may indicate a portion in the recorded presentation information document where the input image was outputted. In this case, the recorded presentation information document may include the contents of output device 116 because the input image is being displayed. As described above, a portion of the recorded presentation information document may be a time range that may include time before or after the time stamp.

In another embodiment, as mentioned above, content matching techniques may be used to determine the portion of the recorded presentation information document. For example, a time period may be determined where the input image was displayed in the recorded presentation information document.

In another embodiment, as mentioned above, the physical location of a device, such as capture device 118, may be used to determine the portion of the recorded presentation information document.

In one embodiment, an action may be performed with the portion of the recorded presentation information document as described in step 310 of FIG. 3.

Figure 5:
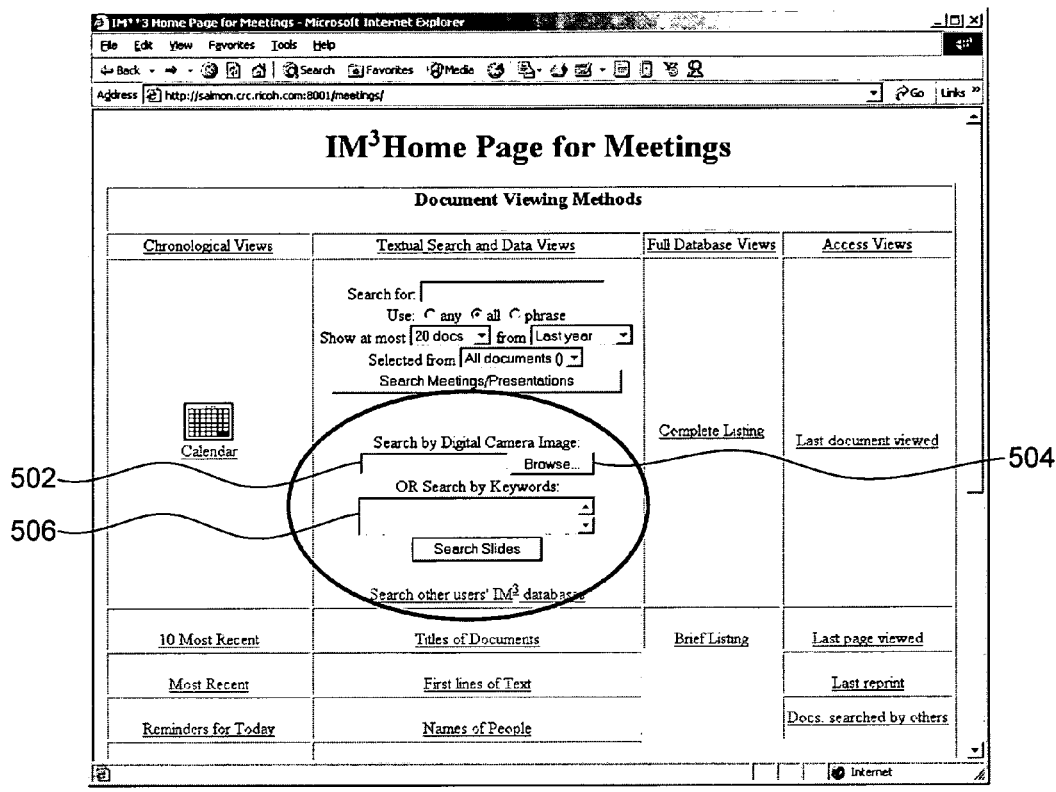
FIG. 5 depicts an interface that may be used to specify an input image according to one embodiment of the present invention.

FIG. 5 depicts an interface 500 that may be used to specify an input image according to one embodiment of the present invention. As shown, an input image may be specified in an entry 502. For example, an identifier to a location where the image may be stored is input in entry 502. The identifier may be a storage location, file identifier, URL or any other identifier. Also, a user may use a browse button 504 to browse for the input image among stored images.

In another embodiment, an input image is specified by entering keywords in entry 506. The keywords may specify content that is included in a slide image that is captured. For example, if a slide included the words "Multimedia Presentation", the keywords "Multimedia Presentation" may be entered to retrieve input images that include the keywords.

In one embodiment, multiple input images may be specified. The multiple images may be used to retrieve a presentation or a point in a presentation. In this case, multiple identifiers may be inputted into entry 502.

Figure 6:
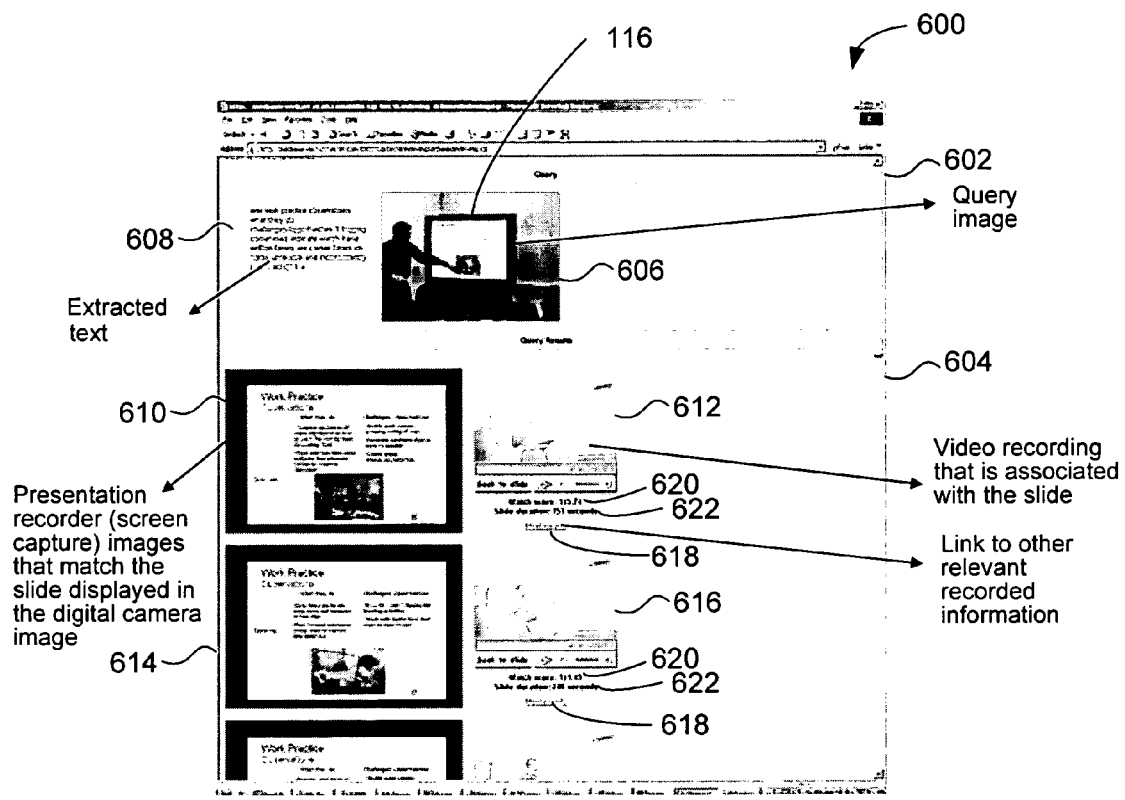
FIG. 6 depicts an interface that displays a portions of the recorded presentation information document in response to receiving an input image according to one embodiment of the present invention.

FIG. 6 depicts an interface 600 that displays a portions of the recorded presentation information document in response to receiving an input image according to one embodiment of the present invention. As shown, interface 600 includes a first window 602 that displays an input image. The input image acts as a query to find matching images. The query may have been specified by an identifier for an input image.

The input image is then retrieved and, as shown, is displayed in window 602 as input image 606. Input image 606 includes an image of a slide being displayed on an output device 116. Also, the image includes a picture of a presenter and also other objects surrounding the output device 116.

From input image 606, text has been extracted as shown in a section 608. The extracted text includes text that has been extracted from a slide that has been outputted on output device 116. The extracted text may be compared to information in an image file.

A second window 604 displays query results for the query. The query results include images of one or more slides determined from the image file and associated portions of a recorded presentation information document.

An image of a first slide is depicted in a window 610 and a first portion of the recorded presentation information document is depicted in window 612 and an image of a second slide is depicted in a window 614 and a second portion of the recorded presentation information document is depicted in a window 616. The image in window 610 includes information found in the recorded presentation information document depicted in window 612. For example, the image of a first slide in window 610 may be displayed in an output device 116 found in the recorded presentation information document depicted in window 612. The same may true for the image of the second slide in window 614 and the second portion of the recorded presentation information document depicted in window 612. As shown, multiple slides may include information that matches the text extracted from the input image 606. In this case, slides may be different in that information other than text shown in the slides is different but the text is substantially the same. It will be understood that slides 610 and 614 may not include the same text as the extracted text 608 but may include substantially similar text.

A link 618 may also be included in window 604. Link 618 may point to other relevant image files. For example, link 618 may be associated with an agenda, a paper, etc. that is relevant to a slide depicted in window 610 or 614, or to the portion of the recorded presentation information document depicted in window 612 or 616.

For each portion of the recorded presentation information document, a match score 620 is displayed along with a slide duration 622. Match score 620 indicates the relevancy of a slide determined in the image file. For example, an algorithm may be used to calculate how relevant information in an image of a slide is to the extracted text. For example, the text extracted may be considered to match exactly with the text depicted in a slide. This may return a high match score. However, a slide may include more text or less text than the extracted text. An algorithm may determine how relevant the slide is. A user may then use match score 620 to determine which portion of the recorded presentation information document is most relevant.

A slide duration 622 shows a time length of the portion of the recorded presentation information document. For example, slide duration 622 may be how long the slide was displayed (plus or minus a certain amount of time). A user may have the choice to play the recorded presentation information document for the slide duration 622 or may choose to play additional parts of the recorded presentation information document before the beginning or ending point of the portion.

Figure 7:
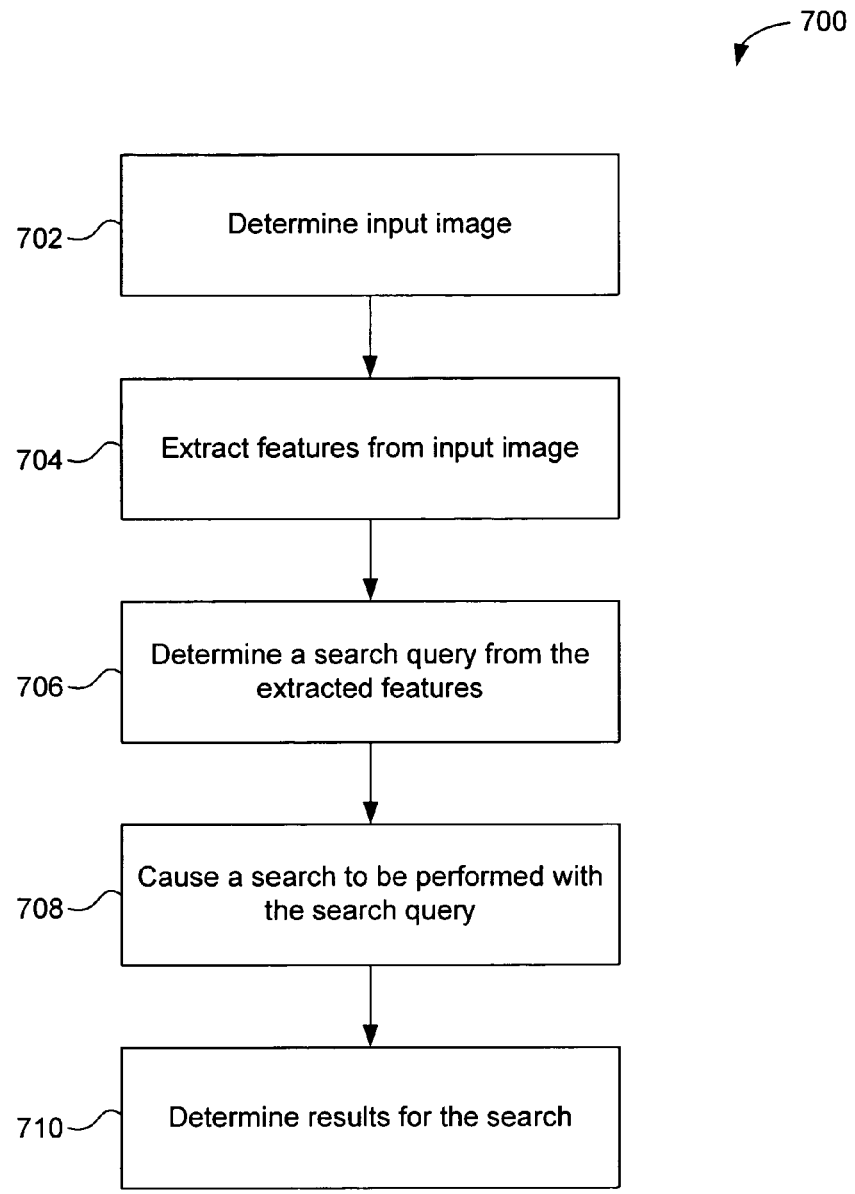
FIG. 7 depicts a simplified flow chart of a method for using an input image to perform a search according to one embodiment of the present invention.

FIG. 7 depicts a simplified flow chart 700 of a method for using an input image to perform a search according to one embodiment of the present invention. The method may be performed by software modules executed by a data processing system, by hardware modules or combinations thereof. Flow chart 700 depicted in FIG. 7 is merely illustrative of an embodiment incorporating the present invention and does not limit the scope of the invention as recited in the claims. One of skill in the art would recognize variations, modifications, and alternatives.

In step 702, an input image is determined. The input image may be determined using techniques described above in step 302 of FIG. 3.

In step 704, features from the input image are extracted. For example, content, such as text, of a slide displayed in an output device 116 may be extracted. In step 706, a search query from the extracted features is determined. In one embodiment, the text is analyzed to determine a search query. For example, words that appear more frequently than others may be used in a search query. Also, more commonly used words, such as "a", "of", etc., may be deleted from the extracted features and the remaining words used as a search query.

In step 708, a search is performed with the search query. For example, a search engine, such as Google, may be automatically invoked with the search query determined in step 706. Additionally, other data may be used in the search. For example, metadata specifying that only PowerPoint *.ppt files should be returned may be included in the search query sent to search engine. In this case, *.ppt files may be searched for on the Internet or Worldwide Web using an input image. Thus, any recorded presentation information documents that include text in a search query may be retrieved. Also, metadata may specify that only slide images (e.g., .smil files) should be returned.

In step 710, the results of the search are determined. The results may include *.ppt files that include information that matches the search query. For example, images of slides that include text that is considered to match the search query are determined.

In one embodiment, the results may then be displayed for a user to choose a recorded presentation information document that is desired. Also, portions of a recorded presentation information document that includes information that matches the *.ppt files may be determined. The portions may then be played, etc.

Figure 8:
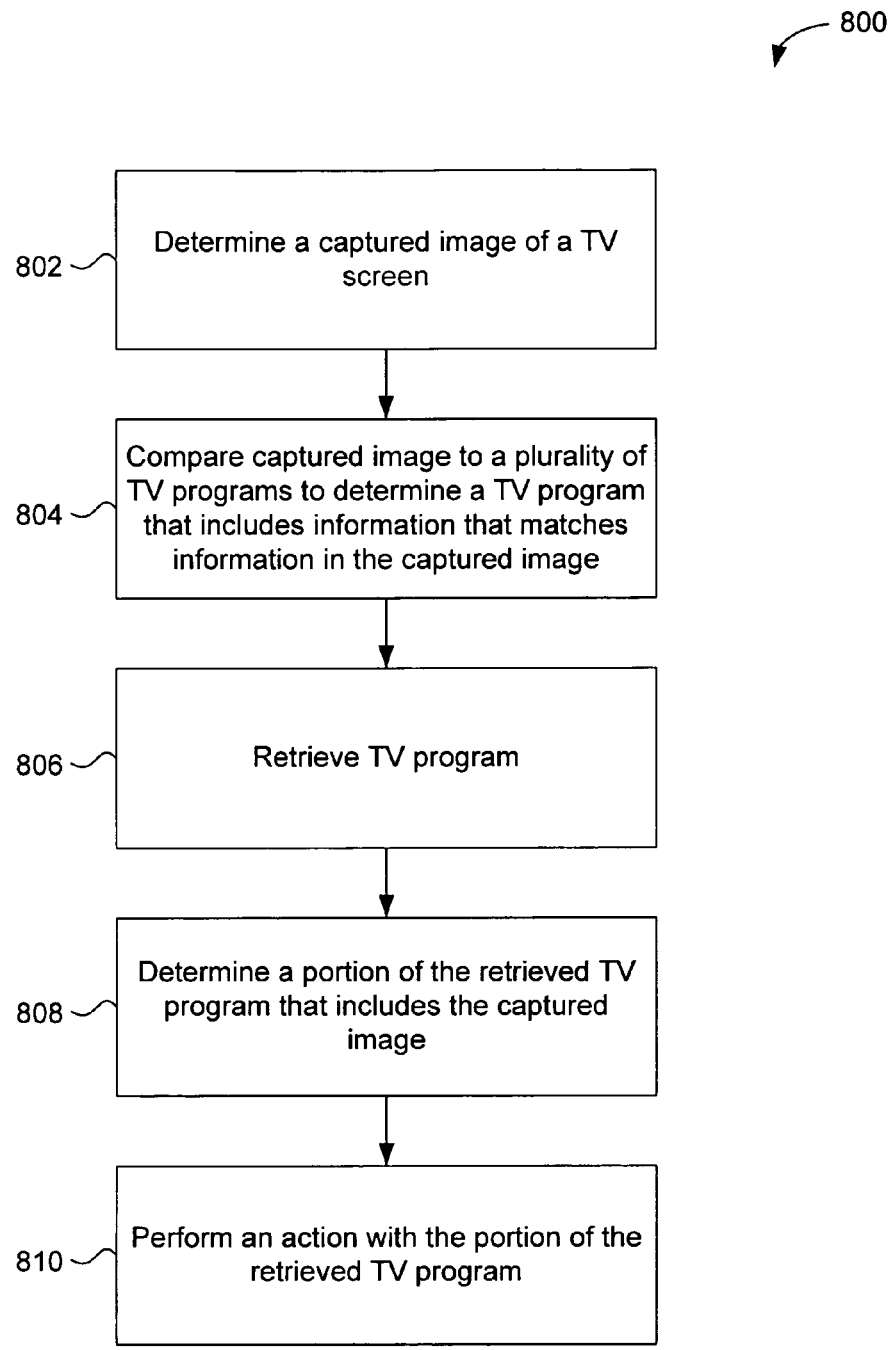
FIG. 8 depicts a simplified flowchart of a method for determining television programs using an input image according to one embodiment of the present invention.

FIG. 8 depicts a simplified flowchart 800 of a method for determining television programs using an input image according to one embodiment of the present invention. The method may be performed by software modules executed by data processing system, by hardware modules or combinations thereof. Flowchart 800 depicted in FIG. 8 is merely illustrative of an embodiment incorporating the present invention and does not limit the scope of the invention as recited in the claims. One of ordinary skill in the art would recognize variations, modifications, and alternatives.

In step 802, an input image including an image of a television screen is determined. In one embodiment, the image may be taken by a digital camera while a television program is being displayed. Also, a television recorder may be programmed to record an image of a television program at a certain point. The images may be determined using techniques described in step 306 of FIG. 3.

In step 804, the input image is compared to a plurality of television programs to determine a television program that includes information that matches information in the input image. In one embodiment, content based matching techniques described above may be used to determine the information that matches the input image. For example, the image of the television screen includes an image of a television program being displayed. The plurality of television programs are searched to determine a television program that includes the image that was captured. For example, the captured image may be matched to keyframes of the plurality of television programs.

Also, if the picture is taken when closed captioning is on, the text of the closed captioning may be extracted from the input image. In one embodiment, optical character recognition (OCR) or other techniques may be used to extract the text. The text is then used in comparing text extracted from the plurality of television programs to determine television programs that include information that matches the captured image.

In step 806, the television program determined in step 804 is retrieved. It will be recognized that multiple TV programs may be determined.

In step 808, a portion of the retrieved television program that includes the input image is determined. In one embodiment, the portion is determined using techniques described in step 308 of FIG. 3. For example, temporal information or content matching techniques are used to determine the portion. In one embodiment, the portion includes the image that is displayed on the television screen of the input image.

In step 810, an action is performed with the portion of the retrieved television program. For example, the television program may be displayed at the beginning point of the portion and a user my have the option of playing the portion. Also, the portion may be displayed and played. Also, the television program or portion of the television program may be sent to a device or stored in a repository for later use by a user. The user may then view the portion of the television program at a later date.

Figure 9:
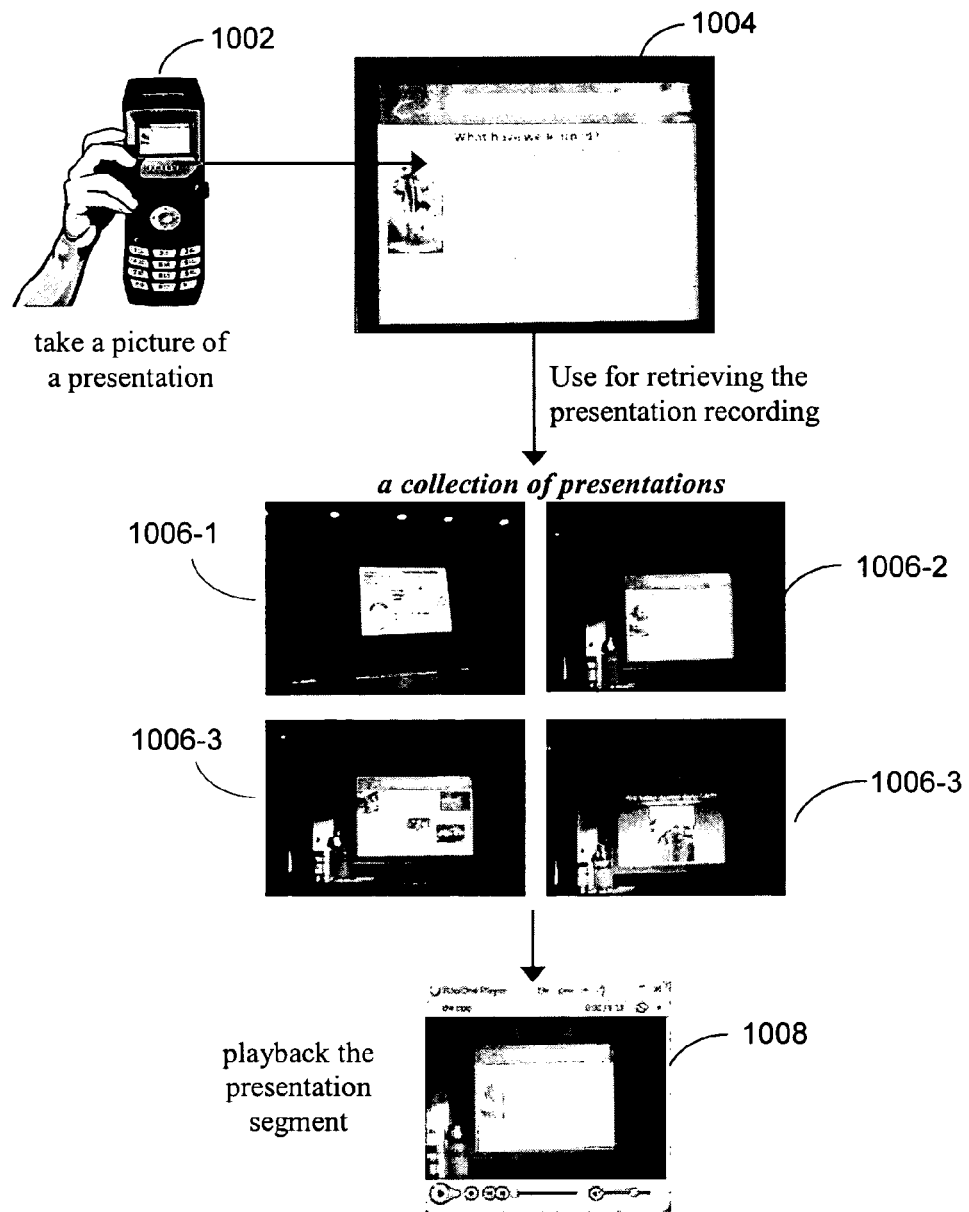
FIG. 9 depicts an embodiment showing using a digital camera for retrieving a collection of recorded presentation information documents and determining a portion in the recorded presentation information documents according to embodiments of the present invention.

FIG. 9 depicts an embodiment showing using a digital camera for retrieving a collection of recorded presentation information documents and determining a portion in the recorded presentation information documents according to embodiments of the present invention. As shown, a digital camera 1002 captures an image during a presentation. The input image of the presentation is shown in window 1004. The input image may include an image of a slide outputted by a symbolic presentation document. In one embodiment, the digital camera image may be different than a screen capture of an image, scan of the image, or image from a source document. A screen capture, scan and image from a source document include only a region of interest (ROI), such as the image of the slide. A digital camera image may include the ROI in addition to surrounding objects, such as the display device, presenter, etc. Also, the ROI from the digital camera image may be occluded and may include motion blur, which may not be included in a screen capture, scan, or image from a source document.

The image is used to retrieve recorded presentation information documents that include information that matches the input image. For example, recorded presentation information 1006-1, -2, -3, and -4 may be searched using techniques described above. In one embodiment, it is determined that recorded presentation information document 1006-2 includes information that matches the input image.

A portion of recorded presentation information document 1006-2 is then determined. The portion may be determined using techniques described above. The portion in recorded presentation information document 1006-2 may then be displayed in an interface 1008 and playback of the portion of recorded presentation information document 1006-2 is enabled.

Accordingly, a digital camera may be used to determine a portion of a recorded presentation information document in a plurality of recorded presentation information documents. Thus, when a user is interested in a certain slide that has been displayed in a presentation, a digital camera may be used to record the moment in which the slide is outputted. A time stamp may be attached to the image and used to determine a portion in the recorded presentation information document that includes an image of the slide that was displayed.

Figure 10:
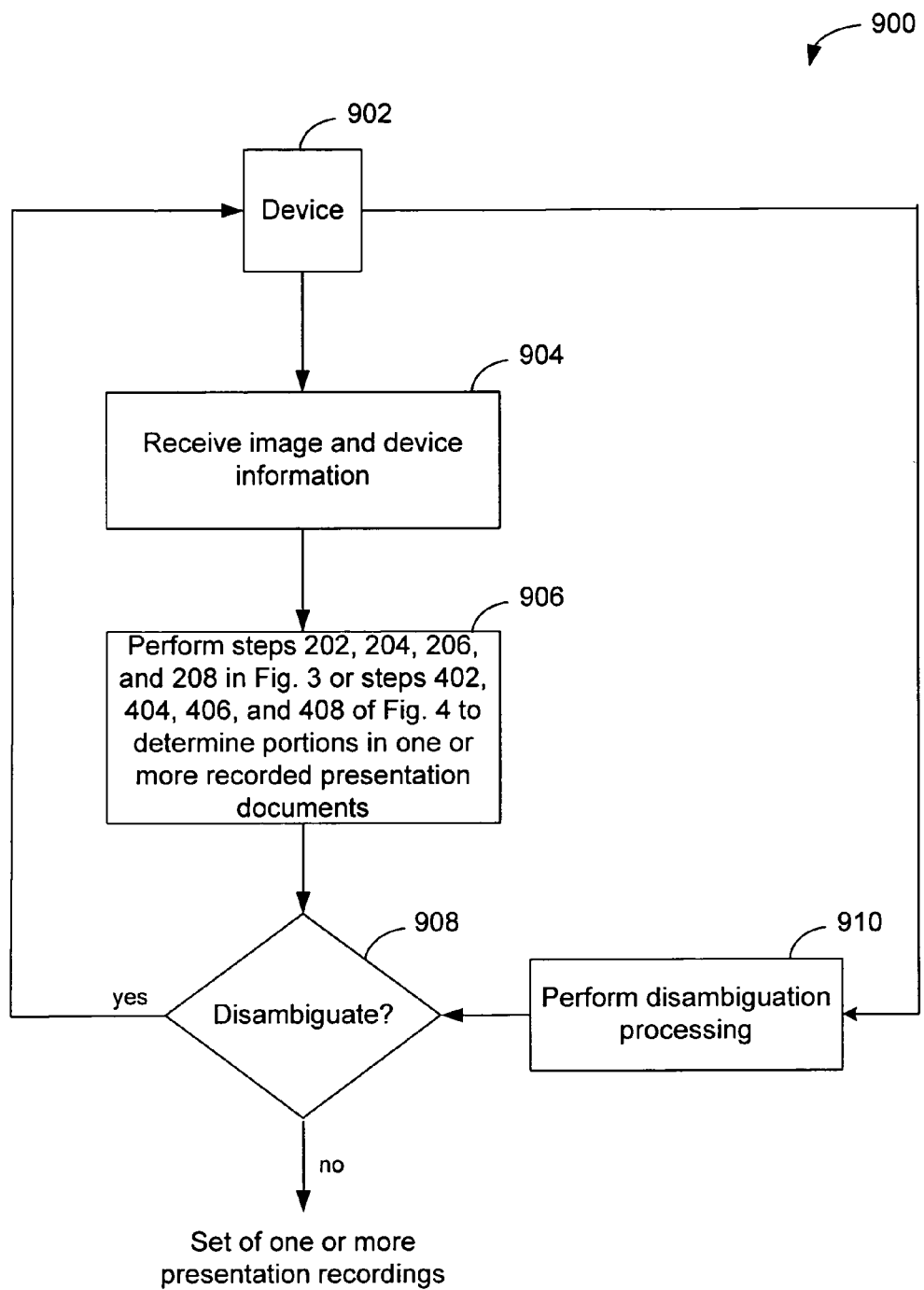
FIG. 10 depicts a simplified flowchart of a method for performing a disambiguation process in determining a portion of one or more recorded presentation information documents according to one embodiment of the present invention.

FIG. 10 depicts a simplified flowchart 900 of a method for performing a disambiguation process in determining a portion of one or more recorded presentation information documents according to one embodiment of the present invention. A device 902 is configured to capture an image. The image and device information is sent from device 902 and is received in step 904. The device information includes any information associated with device 902. For example, the device information may include an address for device 902, such as an identifier for device 902. The identifier may be a phone number if device 902 is cellular phone, a network address, a URL, an 802-11 identifier, etc.

Also, device information may include a command and parameters for the command. The command may indicate how a disambiguation process should be executed. For example, the command may indicate that a match and store process should be performed. In this case, if one or more recorded presentation information documents are determined to include information that matches the image, the one or more recorded presentation information documents should be stored without further feedback from device 902. Also, the command may indicate that an interactive query should be used, in which case information should be sent to device 902 in order for disambiguation of the results to be performed. If a "results only" command is used, parameters may be specified that indicate the type of result (e.g., PowerPoint file, translated PowerPoint file, business card, related document, streamed audio from a conference room, mpeg file for a movie playing in a theater, translated menu, etc.) and a number of results that should be returned. Also, if a command is an interactive query and results command, device 902 should be used to disambiguate the one or more recorded presentation information documents returned and also device 902 should receive the results of the disambiguation process.

In step 906, steps 302, 304, 306, 308 of FIG. 3 or steps 402, 404, 406, and 408 of FIG. 4 are performed to determine a portion of one or more recorded presentation information documents.

When portions in one or more recorded presentation information documents are determined, in step 908, it is determined if the results should be disambiguated. A command indicating whether the disambiguation should be performed may have been received with the device information received in step 904. Also, it may be determined from the results if disambiguation is needed. For example, it may be unclear which recorded presentation information documents include information that matches the input image and thus disambiguation may be needed to determine the one or more recorded presentation information documents.

If disambiguation is not necessary, one or more recorded presentation information documents have been determined.

If disambiguation is desired, information is sent to device 902 for disambiguation. For example, device 902 may be sent images of portions of several recorded presentation information documents. A user may then be prompted to determine which recorded presentation information documents are desired. Additionally, questions may be asked that are used to determine recorded presentation information documents that should be retrieved. For example, a user may be prompted with the question, "Is this Mary Smith's presentation or Bob Jones' presentation?" Depending on the answer, a certain recorded presentation information document may be more applicable than another. Alternatively, a user may be asked to take another picture of the original object perhaps with some alteration in lighting, aspect ratio, or zoom. One reason a user may be prompted to take another picture is because the feature extraction (e.g., the text extraction produced poor results) or too many recorded presentations have been returned by the content base linking.

When the results of the disambiguation process are received from device 902, in step 910, disambiguation processing is performed. For example, if a user had selected certain recorded presentations, those recorded presentations are determined to be the desired ones. Also, additional searches may be performed with the information received from the results of the disambiguation process.

After the disambiguation process is performed, in step 908, it is determined if additional disambiguation processing should be performed. If not, one or more recorded presentation information documents are determined and an action may be performed. Actions may include retrieving information associated with a presentation such as a presenter's business card, the presenter's home page, documents from the presenter's publication list, etc. Other examples include when a picture of a sign on the front of a restaurant is taken, a menu from the restaurant's website may be returned; when a picture in front of a theater is taken, movie times for movies currently showing in the theater may be returned; when a picture of a document is taken, a translation of the document is returned; and when a picture of a bar code is taken, information for the item associated with the bar code is returned.

If disambiguation is still needed, the process described above continues. The disambiguation process allows a user to communicate with a system to determine one or more portions of the one or more recorded presentation information documents. Also, the device information may be used to open a communication channel between the system and device 902. For example, a streaming data link between recording devices in a room and device 902 may be established when an input image is received. The picture of a presentation being given would indicate that a user is present in a location where a presentation being recorded is taking place. The system may send the recorded presentation information to device 902. The communication may continue until the presentation was complete or the user actively disconnects it. Accordingly, a user can receive an audio/video recording of a presentation while it is being given.

Figure 11:
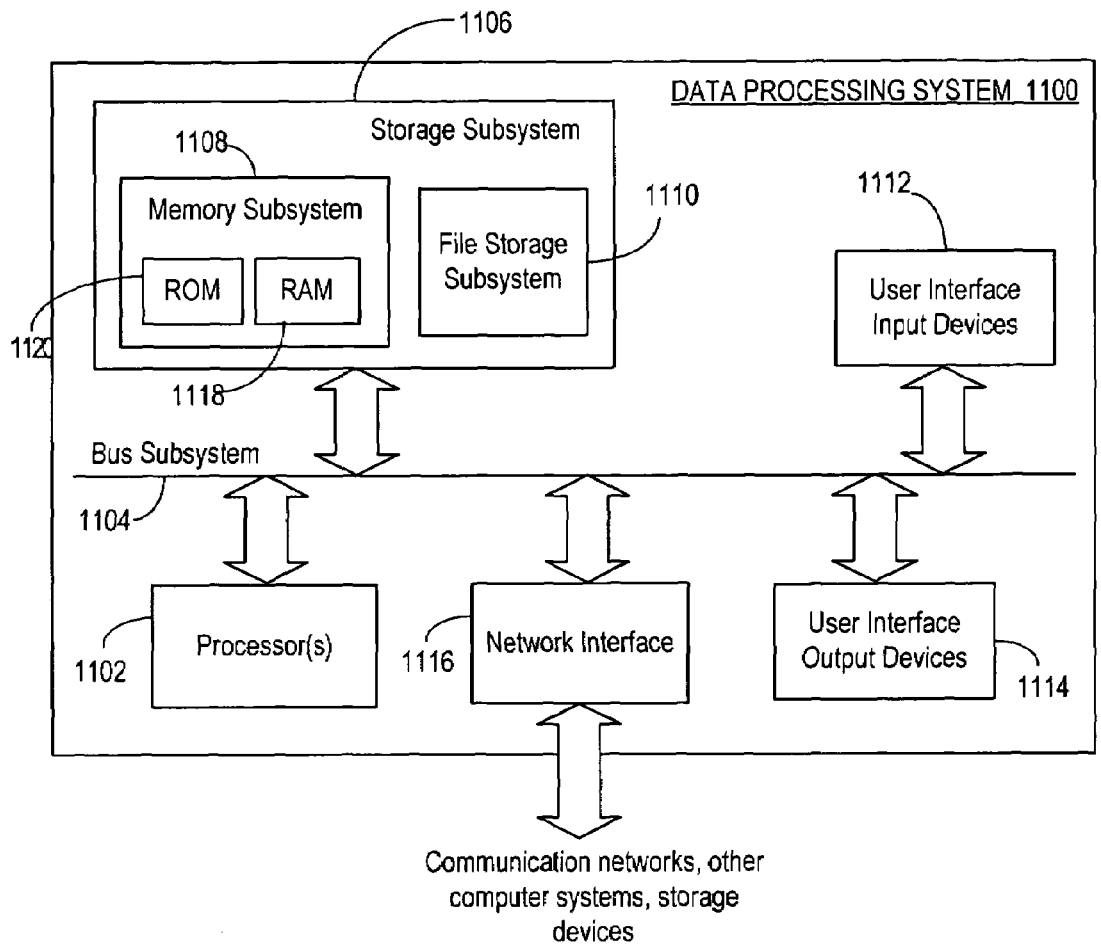
FIG. 11 is a simplified block diagram of a data processing system that may incorporate an embodiment of the present invention.

FIG. 11 is a simplified block diagram of a data processing system 1100 that may incorporate an embodiment of the present invention. As shown in FIG. 11, data processing system 1100 includes at least one processor 1102, which communicates with a number of peripheral devices via a bus subsystem 1104. These peripheral devices may include a storage subsystem 1106, comprising a memory subsystem 1108 and a file storage subsystem 1110, user interface input devices 1112, user interface output devices 1114, and a network interface subsystem 1116. The input and output devices allow user interaction with data processing system 1102.

Network interface subsystem 1116 provides an interface to other computer systems, networks, and storage resources 1104. The networks may include the Internet, a local area network (LAN), a wide area network (WAN), a wireless network, an intranet, a private network, a public network, a switched network, or any other suitable communication network. Network interface subsystem 1116 serves as an interface for receiving data from other sources and for transmitting data to other sources from data processing system 1100. Embodiments of network interface subsystem 1116 include an Ethernet card, a modem (telephone, satellite, cable, ISDN, etc.), (asynchronous) digital subscriber line (DSL) units, and the like.

User interface input devices 1112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 1100.

User interface output devices 1114 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 1100.

Storage subsystem 1106 may be configured to store the basic programming and data constructs that provide the functionality of the present invention. For example, according to an embodiment of the present invention, software modules implementing the functionality of the present invention may be stored in storage subsystem 1106. These software modules may be executed by processor(s) 1102. Storage subsystem 1106 may also provide a repository for storing data used in accordance with the present invention. For example, the images to be compared including the input image and the set of candidate images may be stored in storage subsystem 1106. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 1104 provides a mechanism for letting the various components and subsystems of data processing system 1102 communicate with each other as intended. Although bus subsystem 1104 is shown schematically as a single bus, alternative embodiments of the bus subsystem may utilize multiple busses.

Data processing system 1100 can be of varying types including a personal computer, a portable computer, a workstation, a network computer, a mainframe, a kiosk, or any other data processing system. Due to the ever-changing nature of computers and networks, the description of data processing system 1100 depicted in FIG. 11 is intended only as a specific example for purposes of illustrating the preferred embodiment of the computer system. Many other configurations having more or fewer components than the system depicted in FIG. 11 are possible.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for determining a recorded presentation information document, the method comprising:
    receiving information identifying an input image;
    comparing the input image with a plurality of image file documents to determine an image file document in the plurality of image file documents that includes information that is considered to match the input image; and
    determining a recorded presentation information document that is associated with the image file document that was determined.

2. The method of claim 1, wherein the plurality of image file documents include a plurality of symbolic presentation documents and the image file document that was determined comprises a symbolic presentation document in the plurality of symbolic presentation documents.

3. The method of claim 2, wherein the information that is considered to match the input image comprises an image of a slide in the image file document.

4. The method of claim 1, wherein the image file document that was determined comprises a plurality of recorded images documents, wherein the image file document comprises a recorded images document in the plurality of recorded images documents.

5. The method of claim 4, wherein the recorded images document comprises an image that includes information that matches the input image.

6. The method of claim 5, wherein the image comprises a screen capture of an image of a slide.

7. The method of claim 1, wherein comparing the input image with the plurality of image file documents comprises:
    determining text in the input image,
    determining text in the plurality of image file documents; and
    comparing the text in the input image to text in the plurality of image file documents to determine the image file document that includes information that matches the input image.

8. The method of claim 1, further comprising determining a portion of the image file document that includes information that matches the input image.

9. The method of claim 8, wherein determining the portion of the image file document comprises:
    determining temporal information associated with the input image; and
    using the temporal information to determine the portion.

10. The method of claim 8, wherein determining the portion of the image file document comprises:
    comparing information in the input image with information in the image file document to determine the portion of the image file document that includes information that matches the information in the input image.

11. The method of claim 8, further comprising determining a portion of the recorded presentation information document that includes information that matches the input image.

12. The method of claim 11, wherein determining the portion of the recorded presentation information document comprises:
    determining temporal information associated with the input image; and
    using the temporal information to determine the portion of the recorded presentation information document that includes information that matches the input image.

13. The method of claim 11, wherein determining the recorded presentation information document comprises:
    determining temporal information associated with the portion of the image file document; and
    using the temporal information to determine the portion of the recorded presentation that includes information that matches the input image.

14. The method of claim 11, wherein determining the portion of the recorded presentation information document comprises:
    comparing information in at least one of the input image and the portion of the image file document with information in the recorded images document to determine the portion of the image file document that includes information that matches the information in the input image.

15. The method of claim 8, further comprising performing an action with the portion of the recorded presentation.

16. The method of claim 15, wherein the action comprises at least one of outputting, displaying, playing, and sending the portion of the recorded presentation.

17. The method of claim 8, further comprising using a disambiguation process to determine the portion of the recorded presentation information document.

18. The method of claim 17, wherein using the disambiguation process comprises:
    sending the recorded presentation information document that was determined to a device;
    receiving input information from the device for the recorded presentation information document; and
    using the input information to determine the portion in the recorded presentation information document that includes information that matches the input image.

19. The method of claim 1, wherein determining the recorded presentation information document comprises:

determining association information that associates the image file document with the recorded presentation information document.

20. The method of claim 19, further comprising using information to determine a portion of the recorded information that includes information that matches the input image.

21. The method of claim 20, wherein the information comprises temporal information.

22. The method of claim 1, wherein the input image is captured using a digital camera.

23. A method for determining a recorded images document, the method comprising:
determining a captured image, the captured image including an image of a display;
determining contents of the image of the display; and
using the contents of the display to search a plurality of recorded image documents to identify one or more recorded images documents that include the contents.

24. The method of claim 23, further comprising determining a portion in each of the one or more recorded images documents that includes information that matches the contents of the display.

25. The method of claim 24, further comprising:
determining temporal information associated with the captured image; and
using the temporal information to determine the portion in each of the one or more recorded images documents.

26. The method of claim 24, further comprising retrieving information associated with the portion in each of the one or more recorded images documents.

27. The method of claim 26, further comprising performing at least one of displaying, sending, outputting, and playing the retrieved information.

28. The method of claim 23, wherein the contents of the display comprise an image of a slide of a symbolic presentation document.

29. The method of claim 28, wherein the one or more recorded images documents include information that matches the image of the slide of the symbolic presentation document.

30. The method of claim 28, further comprising retrieving an image of the slide of the symbolic presentation document.

31. The method of claim 30, further comprising performing at least one of displaying, sending, and outputting the retrieved image of the slide.

32. The method of claim 23, wherein determining contents of the display comprises determining text in the captured image,
wherein using the contents of the display to search the plurality of recorded images documents comprises:
determining text in the plurality of recorded images documents; and
comparing the text in the captured image to text in the plurality of recorded images documents to identify the one or more recorded images documents.

33. The method of claim 23, further comprising using a disambiguation process to identify the one or more recorded images documents.

34. The method of claim 33, wherein using the disambiguation process comprises:
selecting a plurality of relevant recorded images documents from a plurality of recorded images documents;
sending the selected plurality of relevant recorded images documents to a device;
receiving input information from the device for the plurality of relevant recorded images documents; and
using the input information to determine the one or more recorded images documents from the plurality of relevant recorded images documents.

35. The method of claim 23, wherein the captured image is captured using a digital camera.

36. The method of claim 23, wherein using the contents of the display to search the plurality of recorded images documents comprises performing a search on a WorldWide Web.

37. The method of claim 23, wherein using the contents of the display to search the plurality of recorded images documents comprises performing a search on a plurality of television programs.

38. A data processing system for determining a recorded presentation information document, the data processing system comprising:
a processor;
a memory coupled to the processor, the memory configured to store a plurality of code modules for execution by the processor, the plurality of code modules comprising:
a code module for receiving information identifying an input image;
a code module for comparing the input image with a plurality of image file documents to determine an image file document in the plurality of image file documents that includes information that that is considered to match the input image;
a code module for determining a recorded presentation information document that is associated with the image file document that was determined.

39. The data processing system of claim 38, wherein the plurality of image file documents include a plurality of symbolic presentation documents and the image file document that was determined comprises a symbolic presentation document in the plurality of symbolic presentation documents.

40. The data processing system of claim 39, wherein the information that is considered to match the input image comprises an image of a slide in the image file document.

41. The data processing system of claim 38, wherein the image file document that was determined comprises a plurality of recorded images documents, wherein the image file document comprises a recorded images document in the plurality of recorded images documents.

42. The data processing system of claim 41, wherein the recorded images document comprises an image that includes information that matches the input image.

43. The data processing system of claim 42, wherein the image comprises a screen capture of an image of a slide.

44. The data processing system of claim 38, wherein the code module for comparing the input image with the plurality of image file documents comprises:
a code module for determining text in the input image,
a code module for determining text in the plurality of image file documents; and
a code module for comparing the text in the input image to text in the plurality of image file documents to determine the image file document that includes information that matches the input image.

45. The data processing system of claim 38, further comprising a code module for determining a portion of the image file document that includes information that matches the input image.

46. The data processing system of claim 45, wherein the code module for determining the portion of the image file document comprises:
a code module for determining temporal information associated with the input image; and a code module for using the temporal information to determine the portion.

47. The data processing system of claim 45, wherein the code module for determining the portion of the image file document comprises:
   a code module for comparing information in the input image with information in the image file document to determine the portion of the image file document that includes information that matches the information in the input image.

48. The data processing system of claim 45, further comprising a code module for determining a portion of the recorded presentation information document that includes information that matches the input image.

49. The data processing system of claim 48, wherein the code module for determining the portion of the recorded presentation information document comprises:
   a code module for determining temporal information associated with the input image; and
   a code module for using the temporal information to determine the portion of the recorded presentation information document that includes information that matches the input image.

50. The data processing system of claim 48, wherein the code module for determining the recorded presentation information document comprises:
   a code module for determining temporal information associated with the portion of the image file document; and
   a code module for using the temporal information to determine the portion of the recorded presentation that includes information that matches the input image.

51. The data processing system of claim 48, wherein the code module for determining the portion of the recorded presentation information document comprises:
   a code module for comparing information in at least one of the input image and the portion of the image file document with information in the recorded images document to determine the portion of the image file document that includes information that matches the information in the input image.

52. The data processing system of claim 45, further comprising a code module for performing an action with the portion of the recorded presentation.

53. The data processing system of claim 52, wherein the action comprises at least one of outputting, displaying, playing, and sending the portion of the recorded presentation.

54. The data processing system of claim 45, further comprising a code module for using a disambiguation process to determine the portion of the recorded presentation information document.

55. The data processing system of claim 54, wherein the code module for using the disambiguation process comprises:
   a code module for sending the recorded presentation information document that was determined to a device;
   a code module for receiving input information from the device for the recorded presentation information document; and
   a code module for using the input information to determine the portion in the recorded presentation information document that includes information that matches the input image.

56. The data processing system of claim 38, wherein the code module for determining the recorded presentation information document comprises:
   a code module for determining association information that associates the image file document with the recorded presentation information document.

57. The data processing system of claim 56, further comprising a code module for using information to determine a portion of the recorded information that includes information that matches the input image.

58. The data processing system of claim 57, wherein the information comprises temporal information.

59. The data processing system of claim 38, wherein the input image is captured using a digital camera.

60. A data processing system for determining a recorded images document, the data processing system comprising:
   a processor;
   a memory coupled to the processor, the memory configured to store a plurality of code modules for execution by the processor, the plurality of code modules comprising:
      a code module for determining a captured image, the captured image including an image of a display;
      a code module for determining contents of the image of the display;
      a code module for using the contents of the display to search a plurality of recorded images documents to identify one or more recorded images documents that include the contents.

61. The data processing system of claim 60, further comprising a code module for determining a portion in each of the one or more recorded images documents that includes information that matches the contents of the display.

62. The data processing system of claim 61, further comprising:
   a code module for determining temporal information associated with the captured image; and
   a code module for using the temporal information to determine the portion in each of the one or more recorded images documents.

63. The data processing system of claim 61, further comprising a code module retrieving information associated with the portion in each of the one or more recorded images documents.

64. The data processing system of claim 63, further comprising a code module for performing at least one of displaying, sending, outputting, and playing the retrieved information.

65. The data processing system of claim 60, wherein the contents of the display comprise an image of a slide of a symbolic presentation document.

66. The data processing system of claim 65, wherein the one or more recorded images documents include information that matches the image of the slide of the symbolic presentation document.

67. The data processing system of claim 65, further comprising a code module for retrieving an image of the slide of the symbolic presentation document.

68. The data processing system of claim 67, further comprising a code module for performing at least one of displaying, sending, and outputting the retrieved image of the slide.

69. The data processing system of claim 60, wherein the code module for determining contents of the display comprises determining text in the captured image, wherein the code module for using the contents of the display to search the plurality of recorded images documents comprises:
   a code module for determining text in the plurality of recorded images documents; and
   a code module for comparing the text in the captured image to text in the plurality of recorded images documents to identify the one or more recorded images documents.

70. The data processing system of claim 60, further comprising a code module for using a disambiguation process to identify the one or more recorded images documents.

71. The data processing system of claim 70, wherein the code module for using the disambiguation process comprises:
  a code module for selecting a plurality of relevant recorded images documents from a plurality of recorded images documents;
  a code module for sending the selected plurality of relevant recorded images documents to a device;
  a code module for receiving input information from the device for the plurality of relevant recorded images documents; and
  a code module for using the input information to determine the one or more recorded images documents from the plurality of relevant recorded images documents.

72. The data processing system of claim 60, wherein the captured image is captured using a digital camera.

73. The data processing system of claim 60, wherein the code module for using the contents of the display to search the plurality of recorded images documents comprises a code module for performing a search on a WorldWide Web.

74. The data processing system of claim 60, wherein the code module for using the contents of the display to search the plurality of recorded images documents comprises a code module for performing a search on a plurality of television programs.

75. A computer program product stored on a computer-readable medium for determining a recorded presentation information document, the computer program product comprising:
  code for receiving information identifying an input image;
  code for comparing the input image with a plurality of image file documents to determine an image file document in the plurality of image file documents that includes information that that is considered to match the input image;
  code for determining a recorded presentation information document that is associated with the image file document that was determined.

76. The computer program product of claim 75, wherein the plurality of image file documents include a plurality of symbolic presentation documents and the image file document that was determined comprises a symbolic presentation document in the plurality of symbolic presentation documents.

77. The computer program product of claim 76, wherein the information that is considered to match the input image comprises an image of a slide in the image file document.

78. The computer program product of claim 75, wherein the code for comparing the input image with the plurality of image file documents comprises:
  code for determining text in the input image,
  code for determining text in the plurality of image file documents; and
  code for comparing the text in the input image to text in the plurality of image file documents to determine the image file document that includes information that matches the input image.

79. The computer program product of claim 75, further comprising code for determining a portion of the image file document that includes information that matches the input image.

80. The computer program product of claim 79, wherein the code for determining the portion of the image file document comprises:
  code for determining temporal information associated with the input image; and
  code for using the temporal information to determine the portion.

81. The computer program product of claim 79, wherein the code for determining the portion of the image file document comprises:
  code for comparing information in the input image with information in the image file document to determine the portion of the image file document that includes information that matches the information in the input image.

82. The computer program product of claim 79, further comprising code for determining a portion of the recorded presentation information document that includes information that matches the input image.

83. The computer program product of claim 82, wherein the code for determining the portion of the recorded presentation information document comprises:
  code for determining temporal information associated with the input image; and
  code for using the temporal information to determine the portion of the recorded presentation information document that includes information that matches the input image.

84. The computer program product of claim 82, wherein the code for determining the recorded presentation information document comprises:
  code for determining temporal information associated with the portion of the image file document; and
  code for using the temporal information to determine the portion of the recorded presentation that includes information that matches the input image.

85. The computer program product of claim 82, wherein the code for determining the portion of the recorded presentation information document comprises:
  code for comparing information in at least one of the input image and the portion of the image file document with information in the recorded images document to determine the portion of the image file document that includes information that matches the information in the input image.

86. The computer program product of claim 79, further comprising code for performing an action with the portion of the recorded presentation.

87. The computer program product of claim 79, further comprising code for using a disambiguation process to determine the portion of the recorded presentation information document.

88. The computer program product of claim 87, wherein the code for using the disambiguation process comprises:
  code for sending the recorded presentation information document that was determined to a device;
  code for receiving input information from the device for the recorded presentation information document; and
  code for using the input information to determine the portion in the recorded presentation information document that includes information that matches the input image.

89. The computer program product of claim 75, wherein he code for determining the recorded presentation information document comprises:
  code for determining association information that associates the image file document with the recorded presentation information document.

90. The computer program product of claim 75, wherein the input image is captured using a digital camera.

91. A computer program product stored on a computer-readable medium for determining a recorded images document, the computer readable medium comprising:
  code for determining a captured image, the captured image including an image of a display;

code for determining contents of the image of the display; and code for using the contents of the display to search a plurality of recorded images documents to identify one or more recorded images documents that include the contents.

92. The computer program product of claim 91, further comprising code for determining a portion in each of the one or more recorded images documents that includes information that matches the contents of the display.

93. The computer program product of claim 92, further comprising:

code for determining temporal information associated with the captured image; and code for using the temporal information to determine the portion in each of the one or more recorded images documents.

94. The computer program product of claim 92, further comprising code for retrieving information associated with the portion in each of the one or more recorded images documents.

95. The computer program product of claim 94, further comprising code for performing at least one of displaying, sending, outputting, and playing the retrieved information.

96. The computer program product of claim 91, wherein the code for determining contents of the display comprises determining text in the captured image, wherein the code for using the contents of the display to search the plurality of recorded images documents comprises:

code for determining text in the plurality of recorded images documents; and code for comparing the text in the captured image to text in the plurality of recorded images documents to identify the one or more recorded images documents.

97. The computer program product of claim 91, further comprising code for using a disambiguation process to identify the one or more recorded images documents.

98. The computer program product of claim 97, wherein the code for using the disambiguation process comprises:

code for selecting a plurality of relevant recorded images documents from a plurality of recorded images documents;

code for sending the selected plurality of relevant recorded images documents to a device;

code for receiving input information from the device for the plurality of relevant recorded images documents; and code for using the input information to determine the one or more recorded images documents from the plurality of relevant recorded images documents.

99. The computer program product of claim 91, wherein the captured image is captured using a digital camera.

100. The computer program product of claim 91, wherein the code for using the contents of the display to search the plurality of recorded images documents comprises code for performing a search on a WorldWide Web.

101. The computer program product of claim 91, wherein the code for using the contents of the display to search the plurality of recorded images documents comprises code for performing a search on a plurality of television programs.

* * * * *